Nov. 16, 1965   F. B. JOHNSEN   3,217,981
CREAM SEPARATOR
Filed Aug. 15, 1962   2 Sheets-Sheet 1

INVENTOR.
FRANK BIRGER JOHNSEN
BY
H.B. Willson & Co
Attorney

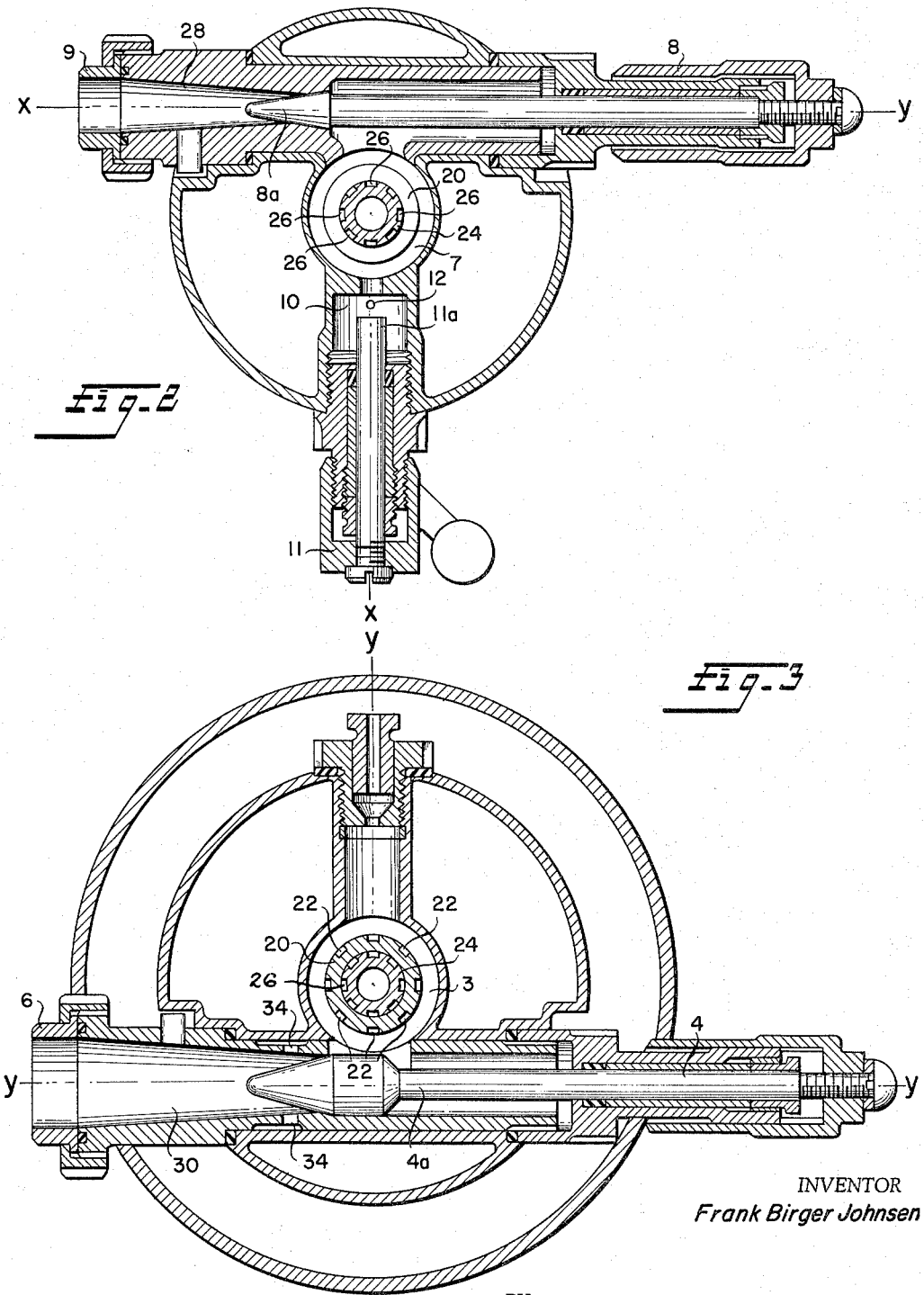

United States Patent Office 3,217,981
Patented Nov. 16, 1965

3,217,981
CREAM SEPARATOR
Frank Birger Johnsen, Virum, Denmark (% H. B. Willson & Co., 600 F St. NW., Washington, D.C.)
Filed Aug. 15, 1962, Ser. No. 217,174
2 Claims. (Cl. 233—19)

The present invention relates generally to improved apparatus for separating a liquid into its components, and more particularly to apparatus for separating milk into its cream and skim milk components and for remixing a portion of the cream with the skim milk to obtain milk of a predetermined constituency suitable for sale and consumption.

In the prior art, it is known to provide separators of the aforementioned type including a bowl or housing having a top portion or casing provided with a plurality of passages for discharging the various separated components. Furthermore, additional external conduits or pipes are often provided for remixing all or desired portions of the components to produce a resultant fluid of a predetermined consistency. The known equipment, when provided with conventional indicator and flow control means, normally is demanding in space, untidy in appearance, and difficult to dismantle and reassemble during the necessary daily cleaning procedures.

The primary object of the present invention is to provide an improved separator that is easily disassembled for cleaning, is compact and space saving to an unusual degree, and tidy in appearance, said separator being characterized in that the provision of the aforementioned external remixing conduits is obviated by arranging the flow control means inside or directly on the top casing portion of the separator housing.

Other objects and advantages of the invention will become apparent from a study of the following specification when considered in conjunction with the accompanying drawing, in which:

FIGURE 2 is a horizontal sectional view taken along lines X—X—X of FIGURE 1; and FIGURE 3 is a horizontal sectional view taken along lines Y—Y—Y of FIGURE 1.

Figure 1:
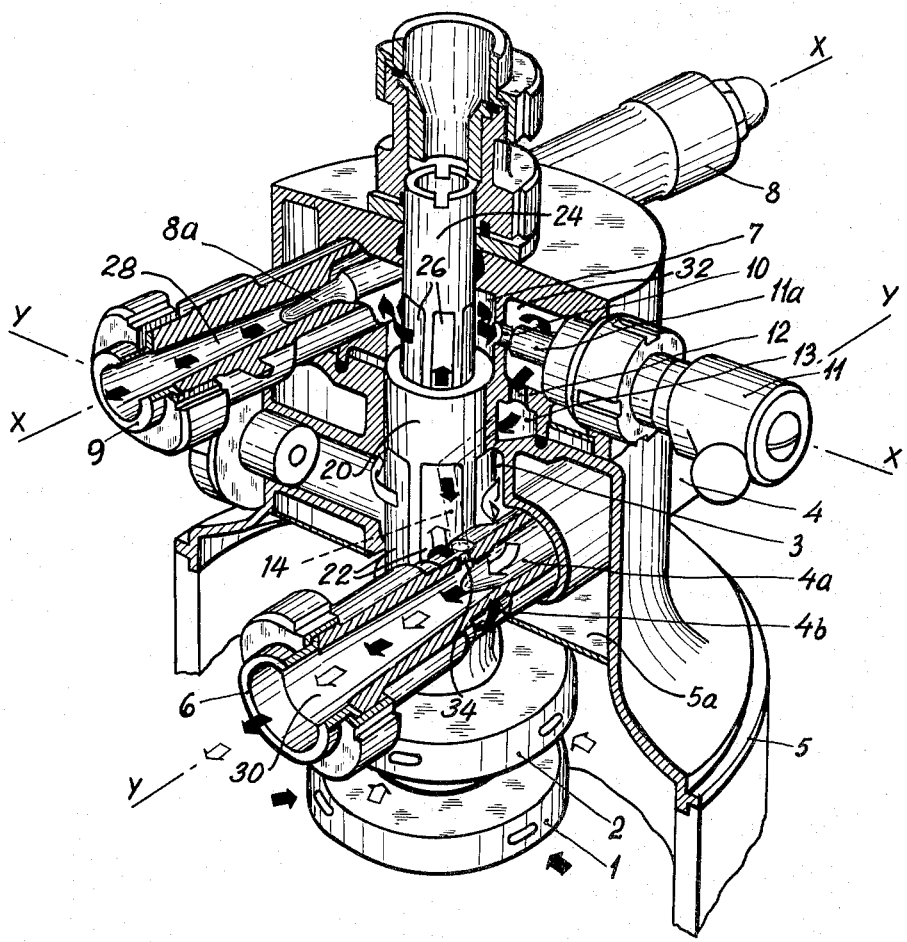
FIGURE 1 is a partially broken away perspective view, with certain parts removed for the sake of clarity, of the separator apparatus of the present invention.

Referring now to the drawing, the separator apparatus includes a housing for containing the liquid to be separated (specifically, milk) and having a top casing 5 of generally bell-shaped configuration. The casing 5, which has a horizontal bottom wall 5a, contains a vertical bore that extends upwardly from the bottom wall and communicates with vertically spaced lower and upper annular chambers 3 and 7, respectively. Mounted coaxially within the bore is a first tubular member 20 that terminates at its upper extremity between the chambers 3 and 7. In its outer periphery the tubular member 20 contains a plurality of vertical grooves 22 that afford continuous communication between the space below horizontal wall 5a and the lower chamber 3.

Mounted concentrically within the first tubular member 20 is a second tubular member 24 the upper extremity of which extends above the coresponding extremity of the first tubular member. In its outer periphery, the second tubular member 24 contains a plurality of vertical grooves 26 that afford continuous communication between the space below horizontal wall 5a and the upper annular chamber 7.

Arranged beneath the horizontal wall 5a are first impeller means 2 for forcing a heavier constituent component (specifically, skim milk) upwardly into the lower annular chamber 3 via the vertical grooves 22. Similarly, second impeller means 1 are provided for forcing the lighter component (i.e., cream) upwardly into the upper annular chamber 7 via the vertical grooves 26 contained in the outer periphery of the second tubular member 24.

Mounted in a horizontal through bore contained in casing 5 adjacent the annular chamber 7 is a needle valve housing 8 containing a discharge passage 28 communicating with upper chamber 7 for discharging the said lighter component therefrom. Conventional adjustable needle valve means 8a control the flow of cream from chamber 7 through discharge passage 28. Similarly, a second needle valve housing 4 is mounted in a horizontal through bore contained in casing 5 adjacent the lower annular chamber 3. The housing 4 contains a discharge passage 30 communicating with lower chamber 3 for discharging skim milk therefrom. Conventional adjustable needle valve means 4a control the flow of skim milk from chamber 3 through discharge passage 30. Couplings 9 and 6 are provided for connecting passages 28 and 30 with conduits containing conventional fluid analyzing instruments, not shown.

In order to effect a desired remixing of a portion of the liquid (cream) chamber 7 with the liquid (skim milk) being discharged from chamber 3 via discharge passage 30, the housing contains remixing passage means including, in succession, an opening 10, chamber 32, opening 12, chamber 13 and passage 14, said passage 14 communicating at its lower end with discharge passage 30 via opening 34 contained in the needle valve housing 4. Mounted in a horizontal bore in casing 5 colinear with opening 10 is a valve housing 11 containing a conventional valve element 11a that is operable to close or open the opening 10.

In operation, assume that the needle valves 8a and 4a are set to desired throttling positions and that the valve element 11a is closed upon opening 10 to close the remixing passage. The skim milk is now forced by impeller 2 upwardly into chamber 3 via vertical grooves 22, and skim milk under pressure is discharged from chamber 3 through discharge passage 30 that is throttled by needle valve 4a. Similarly, the cream is forced by impeller 1 upwardly into chamber 7 via grooves 26, whereupon the cream is discharged from chamber 7 via passage 38 throttled by needle valve 8a.

In the event that remixing of a portion of the cream with the skim milk is desired, valve element 11a is opened, whereby cream from chamber 7 is supplied to the skim milk discharge passage 30 via opening 10, chamber 32, opening 12, chamber 13, passage 14 and opening 34. As is obvious from the drawing, by proper adjustment of the needle valves 8a and 4a, the percentage of the constitutents of the resultant liquid discharged via discharge passage 30 may be accurately regulated and controlled.

While in accordance with the provisions of the Patent Statutes the preferred form and embodiment of the invention has been illustrated and described, it will be apparent to those skilled in the art that various changes and modifications may be made in the apparatus described without deviating from the invention set forth in the following claims.

What is claimed is:
1. Apparatus for separating from a liquid constituent components having different densities, comprising
 a stationary housing for containing said liquid and having a vertically-arranged generally bell-shaped top casing including a horizontal bottom wall, said casing containing a vertical bore extending upwardly from said bottom wall, and vertically spaced lower and upper annular chambers concentrically arranged about and in communication with said bore;

a first tubular member mounted coaxially in said bore, the upper extremity of said first tubular member terminating between said lower and upper annular chambers and the lower end of said tubular member extending below said horizontal wall, said first tubular member containing in its outer periphery a plurality of vertical grooves affording continuous communication solely between the space beneath said horizontal wall and said lower annular chamber;

a second tubular member mounted concentrically within said first tubular member, the upper and lower extremities of said second tubular member extending above and below the corresponding extremities of said first tubular member, respectively, said second tubular member containing in its outer periphery a plurality of vertical grooves affording continuous communication between the space below said bottom wall and said upper chamber, respectively;

first impeller means arranged beneath said bottom wall for forcing a heavier liquid component upwardly into said lower chamber through the vertical grooves in said first tubular member;

second impeller means arranged beneath said bottom wall for forcing a lighter liquid component upwardly into said upper chamber through the vertical grooves in said second tubular member;

said casing containing also horizontal first passage means for discharging fluid from said upper chamber and horizontal second passage means for discharging fluid from said lower chamber, said casing containing also third passage means affording communication between said upper chamber and said second passage means;

and first, second and third valve means controlling the flow of fluid through said first, second and third passage means, respectively.

2. Apparatus as defined in claim 1 wherein said casing includes a pair of vertically-spaced horizontal bores adjacent said lower and upper chambers, respectively, and further wherein each of said first and second valve means comprises a needle valve housing mounted in one of said horizontal bores and containing one of said first and second discharge passages, said discharge passage being in communication at one end with the chamber associated therewith, and a needle valve for controlling the flow of fluid through said discharge passage.

References Cited by the Examiner
UNITED STATES PATENTS

| | | | |
|---|---|---|---|
| 2,344,888 | 3/1944 | Lindgren | 233—22 |
| 2,622,796 | 12/1952 | Steinacker et al. | 233—19 |
| 2,726,808 | 12/1955 | Fitzsimmons | 233—19 |
| 2,761,618 | 9/1956 | Fitzsimmons | 233—19 |

M. CARY NELSON, *Primary Examiner.*

ALDRICH F. MEDBERY, *Examiner.*